United States Patent
Hirai et al.

(10) Patent No.: US 11,158,851 B2
(45) Date of Patent: Oct. 26, 2021

(54) ELECTRODE FOR ELECTROCHEMICAL DEVICE, ELECTROCHEMICAL DEVICE, AND METHOD FOR MANUFACTURING SAME

(71) Applicant: Envision AESC Energy Devices Ltd., Sagamihara (JP)

(72) Inventors: Masanori Hirai, Sagamihara (JP); Kazuya Mimura, Sagamihara (JP)

(73) Assignee: Envision AESC Energy Devices Ltd., Sagamihara (JP)

(*) Notice: Subject to any disclaimer, the term of this patent is extended or adjusted under 35 U.S.C. 154(b) by 106 days.

(21) Appl. No.: 16/345,989

(22) PCT Filed: Oct. 31, 2017

(86) PCT No.: PCT/JP2017/039290
§ 371 (c)(1),
(2) Date: Apr. 29, 2019

(87) PCT Pub. No.: WO2018/079817
PCT Pub. Date: May 3, 2018

(65) Prior Publication Data
US 2020/0067081 A1    Feb. 27, 2020

(30) Foreign Application Priority Data
Oct. 31, 2016    (JP) .............................. JP2016-212820

(51) Int. Cl.
*H01M 4/36*    (2006.01)
*H01M 4/13*    (2010.01)
(Continued)

(52) U.S. Cl.
CPC ............ *H01M 4/366* (2013.01); *H01G 11/28* (2013.01); *H01M 4/0404* (2013.01); *H01M 4/13* (2013.01);
(Continued)

(58) Field of Classification Search
CPC .... H01M 4/366; H01M 4/0404; H01M 4/139; H01M 4/13; H01M 4/628;
(Continued)

(56) References Cited

U.S. PATENT DOCUMENTS

| 2010/0221607 A1* | 9/2010 | Hatanaka | H01M 2/1673 429/209 |
| 2011/0236761 A1* | 9/2011 | Endo | H01M 4/139 429/234 |
| 2017/0040584 A1* | 2/2017 | Kurakane | H01M 10/0525 |

FOREIGN PATENT DOCUMENTS

| JP | 2009-038016 A | 2/2009 |
| JP | 2012-074359 A | 4/2012 |

(Continued)

OTHER PUBLICATIONS

International Search Report for PCT/JP2017/039290, dated Feb. 6, 2018.

*Primary Examiner* — Lisa S Park
(74) *Attorney, Agent, or Firm* — Sughrue Mion, PLLC

(57) ABSTRACT

An electrode for an electrochemical device has a coated portion in which an active material layer is formed on a current collector; a non-coated portion in which the active material layer is not formed; and a resin layer that is laminated such that the coated portion and a portion of the non-coated portion are covered; wherein: the resin layer has a high-permeability portion having high ion permeability and positioned on the coated portion; a low-permeability portion having low ion permeability and positioned on a portion of the non-coated portion; and a transition portion in which ion permeability decreases from the high-permeability portion side toward the low-permeability portion side and positioned between the high-permeability portion and the low-permeability portion.

18 Claims, 6 Drawing Sheets

(51) Int. Cl.
  *H01M 4/62* (2006.01)
  *H01G 11/28* (2013.01)
  *H01G 11/86* (2013.01)
  *H01M 10/0525* (2010.01)
  *H01M 10/0585* (2010.01)
  *H01M 4/04* (2006.01)
  *H01M 4/139* (2010.01)
  *H01M 4/02* (2006.01)

(52) U.S. Cl.
  CPC ........... *H01M 4/139* (2013.01); *H01M 4/628* (2013.01); *H01M 10/0525* (2013.01); *H01M 10/0585* (2013.01); *H01M 2004/021* (2013.01)

(58) Field of Classification Search
  CPC ......... H01M 10/0525; H01M 10/0585; H01M 2004/021; H01M 4/621; H01M 4/62; H01M 4/06; H01M 4/02; H01G 11/28; H01G 11/26; H01G 11/12; H01G 11/80; H01G 11/22; Y02E 60/10
  See application file for complete search history.

(56) References Cited

FOREIGN PATENT DOCUMENTS

| | | |
|---|---|---|
| JP | 2012-099385 A | 5/2012 |
| JP | 2012-114079 A | 6/2012 |
| JP | 2012-178252 A | 9/2012 |
| JP | 2013-196781 A | 9/2013 |
| JP | 2015-517189 A | 6/2015 |
| JP | 2015-222657 A | 12/2015 |
| JP | 2017-143006 A | 8/2017 |
| WO | 2005/067080 A1 | 7/2005 |
| WO | 2013/176161 A1 | 11/2013 |
| WO | 2016/063612 A1 | 4/2016 |

* cited by examiner

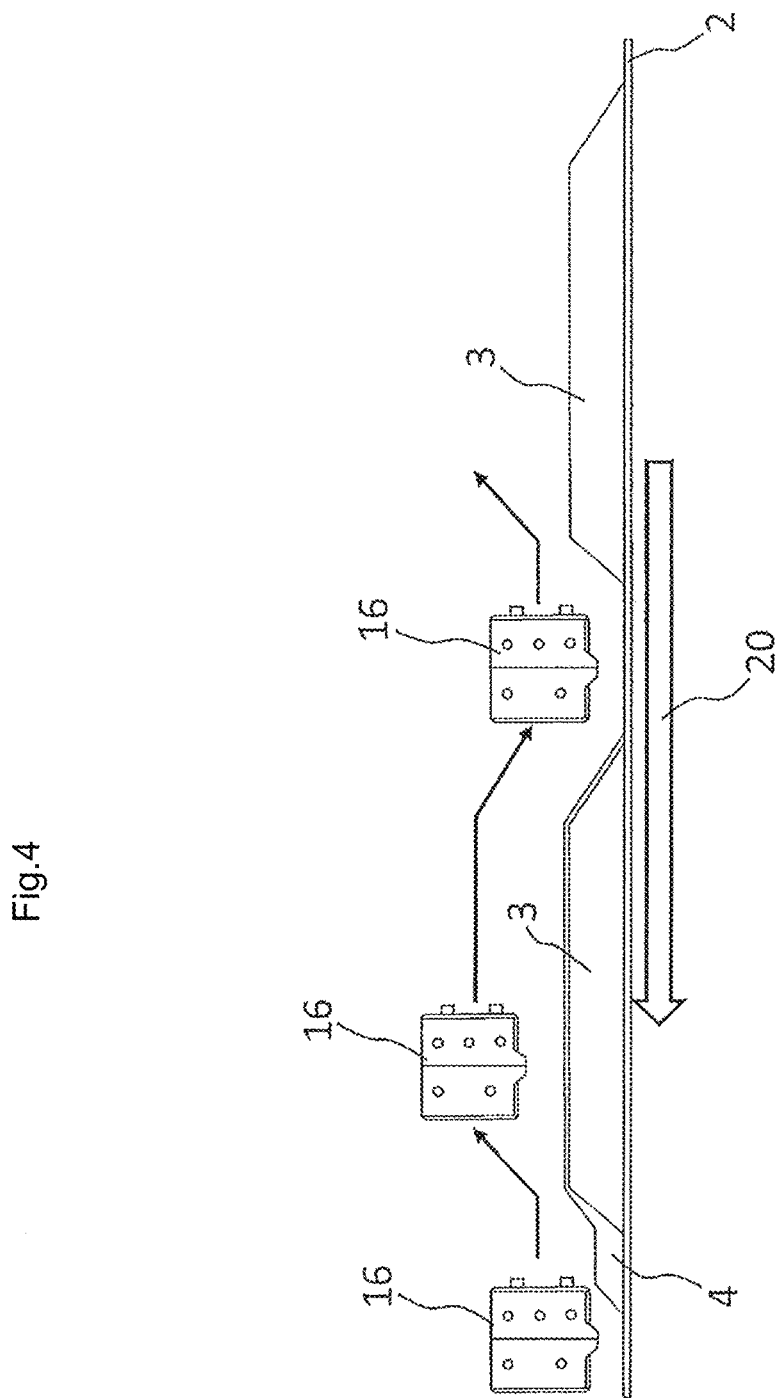

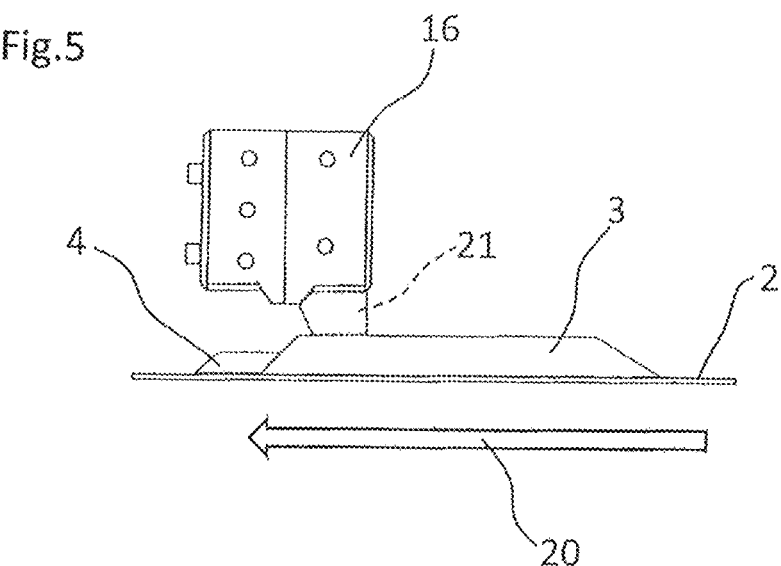
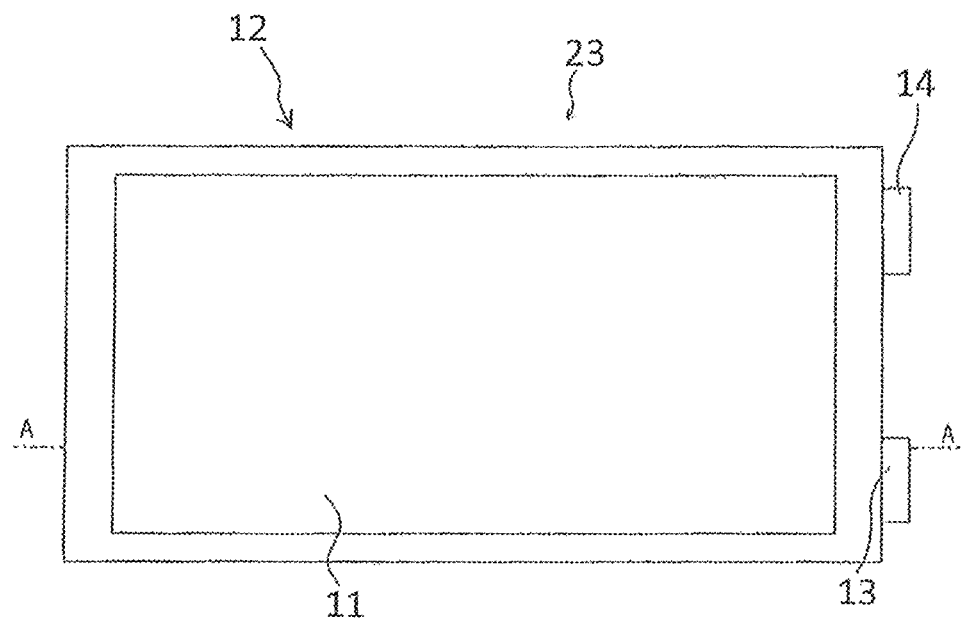

ELECTRODE FOR ELECTROCHEMICAL DEVICE, ELECTROCHEMICAL DEVICE, AND METHOD FOR MANUFACTURING SAME

This Application is a National Stage of International Application No. PCT/JP2017/039290 filed Oct. 31, 2017, claiming priority based on Japanese Patent Application No. 2016-212820 filed Oct. 31, 2016, the disclosure of which is incorporated herein in its entirety by reference.

TECHNICAL FIELD

The present invention relates to an electrode for an electrochemical device, an electrochemical device, and a method for manufacturing an electrochemical device and electrochemical device electrode.

BACKGROUND ART

Laminated-type electrochemical devices are one type of electrochemical devices such as secondary batteries are widely used as electric power sources of cellular phones, digital still cameras, laptop computers, electric vehicles and home energy storage systems. A laminated-type electrochemical device is comprised of a multilayered electrode body in which a plurality of positive electrodes, a plurality of negative electrodes, and a plurality of separators that separates each pair of the positive electrode and the negative electrode.

The electrode sheets for an electrochemical device are comprised of coated portions which are coated with active material on a current collector and a non-coated portion where the active material is not coated to connect an electrode terminal. A conductive auxiliary agent and/or a binding agent may also be coated. In a laminated-type electrochemical device, the multilayered electrode body is sealed within an external container. One end of a positive electrode terminal is electrically connected to the non-coated portions of positive electrodes, and the other end extends to the outside of the external container. One end of a negative electrode terminal is electrically connected to non-coated portions of negative electrodes, and the other end extends to the outside of the external container. Electrolyte is sealed inside the external container together with the multilayered electrode body.

A capacity of a secondary batteries is on the increase year by year, and a quantity of heat generated in the event of a short circuit also increases. So secondary batteries are demanded to be further taken measures to meet safety. One example of such a safety measure is a structure in which tape type insulating members are arranged on the boundary portions between coated portions and non-coated portions to prevent short circuits between positive electrode and negative electrode.

Patent Document 1 discloses an electrode having a structure in which alumina paste is coated on a boundary portions between a coated portion and a non-coated portion of a positive electrode to form an alumina-containing layer, instead of a tape type insulating member.

Patent Document 2 discloses a structure in which the density of a protruding insulating member on a surface of a current collector is different from that in a region in which the thickness of an end portion of a positive electrode active material layer is not uniform, that is to say, a non-uniform region.

Patent Document 3 discloses a structure in which a heat resistant porous layer is provided such that the heat resistant porous layer and the current collector enclose the active material layer.

PRIOR ART DOCUMENTS

Patent Documents

Patent Document 1: JP2012-74359A
Patent Document 2: WO2013/176161A
Patent Document 3: JP2012-99385A

SUMMARY OF THE INVENTION

Problem to be Solved by the Invention

Patent Document 1 describes an example in which an alumina-containing layer is provided only in a tapered region where the thickness of the active material layer gradually decreases. In the invention of Patent Document 2, one end portion of the protruding insulating member is arranged in the non-uniform region of the end portion of the active material layer.

In Patent Document 1 and Patent Document 2, it is difficult to distinguish the boundary portion between the flat portion and the portion where the thickness of the active material layer changes. Therefore, the position of the insulating member tends to become unstable. On the other hand, if the length of the portion where the thickness changes is increased, the insulating member can be easily arranged. However, it is not preferable to increase the length of the portion where the thickness changes, because the capacity of that portion is small. There is also a concern that productivity will decrease if the protruding insulating member is formed by a coating process using an ink jet method as in Patent Document 2.

In the invention of Patent Document 3, the entire active material layer is covered by a heat-resistant porous layer. However, no consideration is given to any change in the thickness of the end portion of the active material layer or to the thickness of the heat-resistant porous layer formed on the current collector.

The present invention provides an electrode for an electrochemical device, an electrochemical device, and a method of manufacturing the electrode and the electrochemical device that can obtain the effects that will prevent the occurrence of an electrical short circuit with an adjacent electrode, prevent or reduce a decrease of the capacitive energy density, and prevent peeling of the active material layer applied on an electrode.

Means for Solving the Problem

The electrode for an electrochemical device comprising: a coated portion in which an active material layer is formed on a current collector; a non-coated portion in which the active material layer is not formed; and a resin layer that is laminated such that the coated portion and a portion of the non-coated portion are covered; wherein: the resin layer has a high-permeability portion having high ion permeability and positioned on the coated portion; a low-permeability portion having low ion permeability and positioned on a portion of the non-coated portion; and a transition portion in which ion permeability decreases from the high-permeability portion side toward the low-permeability portion side and positioned between the high-permeability portion and the low-permeability portion.

Effect of the Invention

The present invention enables preventing an electrical short circuit with an adjacent electrode, whereas it prevents or reduces a decrease in capacitive energy density.

In addition, the present invention also obtains the effect of preventing peeling of the active material layer applied on the electrode.

Furthermore, when a resin layer is formed by applying a coating agent, the thickness can be gradually decreased toward the end of the resin layer. In the conventional structure having an adhesive insulating tape, difference in thickness occurs at the edge portion of the insulating tape. However, it is possible to prevent or reduce the difference in thickness by using the aforementioned structure of the present invention.

Accordingly, when plural electrodes of the present invention are laminated, uniform pressure can be applied to the laminated electrodes when someone uses them. As a result, a decrease of the cycle property can be prevented or reduced.

BRIEF DESCRIPTION OF THE DRAWINGS

FIG. 4 is a side view schematically showing the resin layer formation steps of the method for manufacturing the electrode of the present invention.

FIG. 5 is a side view schematically showing another example of the resin layer formation steps of the method for manufacturing the electrode of the present invention.

FIG. 6A is a side sectional view of the laminated-type secondary battery that is an example of the electrochemical device of the present invention.

EMBODIMENT OF THE INVENTION

Exemplary embodiment of the present invention is next described with reference to the drawings.

Basic Structure of an Electrode

The basic structure of an electrode of an exemplary embodiment of the present invention is next described. Electrode 1 shown in FIGS. 1A-1C comprises current collector 2 and active material layer 3 that is coated on current collector 2. Active material layer 3 is formed on the both sides of current collector 2 such that a coated portion of active material layer 3 and a non-coated portion are present on the both sides of current collector 2.

Figure 1A:
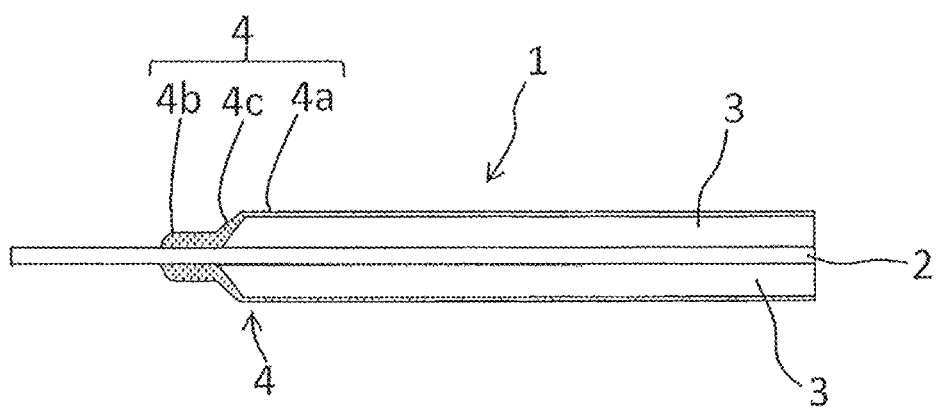
FIG. 1A is a side view of the electrode of an exemplary embodiment of the present invention.

More specifically, one end portion of the longitudinal direction of active material layer 3, for example, the end portion on the left side of FIG. 1A, is away from the end portion of current collector 2, whereby a non-coated portion remains in which active material layer 3 is not formed on current collector 2. The other end portion in the longitudinal direction of active material layer 3, for example, the end portion on the right side of FIG. 1A, terminates at the same position as current collector 2, and a non-coated portion is not present on this portion.

Resin layer 4 is formed to cover entire active material layer 3. Entire active material layer 3 is the entire coated portion. Resin layer 4 extends beyond the boundary portion between the coated portion and the non-coated portion to cover a part of the non-coated portion. Resin layer 4 covers the coated portion and a part of the non-coated portion, but resin layer 4 does not cover one end portion of current collector 2.

As one example, a coating agent in which an insulating material such as alumina powder is dispersed in solvent together with a polymer is coated on current collector 2 and active material layer 3. The solvent is then caused to evaporate. The insulating material and polymer are hardened while forming minute voids between the insulating material and polymer, thereby forming resin layer 4.

Resin layer 4 has higher heat resistance than separator 8 described below. As shown in FIG. 1C, resin layer 4 has high-permeability portion 4a, low-permeability portion 4b, and transition portion 4c.

High-permeability portion 4a is positioned on flat surface 3a that is the upper surface of active material layer 3 and is thin. Low-permeability portion 4b is positioned on current collector 2 of the non-coated portion and is thick. Transition portion 4c is positioned between high-permeability portion 4a and low-permeability portion 4b and has ion permeability that gradually decreases from high-permeability portion 4a side to low-permeability portion 4b side. As an example, the length of high-permeability portion 4a along the longitudinal direction of electrode 1 is at least 3 mm. One end portion of high-permeability portion 4a is adjacent to transition portion 4c. The other end portion of high-permeability portion 4a is directly on the current collector foil. The length of transition portion 4c is about 2 mm. No particular limitations apply to the length of low-permeability portion 4b, but the length is preferably at least 3 mm but no greater than 10 mm to ensure insulation and prevent the outer shape of the battery from being too large.

The technical significance of resin layer 4 of the present invention is next described. At the time of charging/discharging of an electrochemical device such as a secondary battery, the transfer of ions, for example, lithium ions, is carried out between the active material layer 3 and the electrolyte. If the ion permeability of resin layer 4 that covers active material layer 3 is too low, the sufficient transfer of ions cannot be carried out and active material layer 3 of electrode 2 will be unable to perform a satisfactory charging/discharging operation. Accordingly, resin layer 4 positioned on upper surface 3a of active material layer 3 must be high-permeability portion 4a that has high ion permeability.

On the other hand, the non-coated portion is positioned on the end portion of the electrode. If separator 8 shrinks due to heat generated in the battery, the non-coated portion on the end portion of the electrode is prone to making contact with an adjacent electrode. The adjacent electrode has a different polarity. Accordingly, low-permeability portion 4*b* in the non-coated portion should have high insulative properties and high resistivity.

The method of forming active material layer 3 is here taken into consideration. Active material layer 3 is typically formed by applying and hardening a coating agent, that is a mixture containing an active material, on current collector 2*a*. At this time, the end portion of active material layer 3 at the boundary portion between the coated portion and the non-coated portion, is not easily formed in a perpendicularly abrupt shape. Normally, the end portion of active material layer 3 is formed in an inclined-plane shape as shown in FIGS. 1C and 2B. The inclined-plane shaped portion in FIG. 1C functions as an electrode. Transition portion 4*c* is provided in which the ion permeability changes along the inclined-plane shaped portion 3*b*.

The inclined-plane shaped portion 3*b* of active material layer 3 is formed such that the thickness decreases from the central portion side of the electrode toward the end portion side. The high-permeability portion 4*a* is on the central portion side of the electrode. The low-permeability portion 4*b* is on the end portion side. Transition portion 4*c* of resin layer 4 is formed such that the thickness increases from the high-permeability portion 4*a* side toward the low-permeability portion 4*b* side. Thickness of inclined-plane shaped portion 3*b* decreases from the central portion side toward the end portion side. Thickness of transition portion 4*c* increases and ion permeability of transition portion 4*b* decreases from the high-permeability portion 4*a* side toward the low-permeability portion 4*b* side. A portion of transition portion 4*c* having relatively high ion permeability covers the portion of the inclined-plane shaped portion 3*b* having a large amount of active material. The portion of the inclined-plane shaped portion 3*b* having a large amount of active material is thick and makes a large contribution to capacity. The portion of transition portion 4*c* having relatively high ion permeability is thin. As a result, ions can be transferred between the portion of the inclined-plane shaped portion 3*b* and the electrolyte.

On the other hand, a portion of transition portion 4*c* having relatively low ion permeability covers the portion of the inclined-plane shaped portion 3*b* having a small amount of active material. The portion of the inclined-plane shaped portion 3*b* having a small amount of active material is thin and makes a small contribution to capacity. There is a high possibility that the portion of the inclined-plane shaped portion 3*b* having a small amount of active material comes in contact with an opposing electrode, when abnormal shrinkage of separator 8 occurs. The portion of transition portion 4*c* having relatively low ion permeability is thick. The insulative properties are thus increased.

This variation of the ion permeability of transition portion 4*c* of resin layer 4 along the longitudinal direction of electrode 1 simultaneously enables both the prevention or reduction of decrease of the battery capacity and the ensuring of insulative properties.

The change of the layer thickness of the inclined-plane shaped portion 3*b* of active material layer 3 and the change of the layer thickness of transition portion 4*c* of resin layer 4 need not be inversely proportional.

One reason for this relation is that the function of the inclined-plane shaped portion 3*b* of active material layer 3 as an electrode depends on the amount of active material, but the amount of active material is not necessarily proportional to the layer thickness. For example, when the density of active material layer 3 changes, the amount of active material and the layer thickness may not be proportional. As a result, the layer thicknesses of the inclined-plane shaped portion 3*b* and transition portion 4*c* need not be in inverse proportion.

In addition, the present invention is not limited to a configuration in which the layer thicknesses of the inclined-plane shaped portion 3*b* and transition portion 4*c* continuously decrease. The present invention may also comprise a configuration in which these thicknesses decrease in steps or a configuration in which these thicknesses decrease irregularly.

The above explanation presupposes that the ion permeability of resin layer 4 depends on the layer thickness. However, the ion permeability of resin layer 4 may also depend on other factors.

For example, the ion permeability is low in a portion where the insulation resistance of resin layer 4 is high. The ion permeability is high in a portion where the insulation resistance is low.

Further, the ion permeability is low in portions where the density of resin layer 4 is high, and the ion permeability is high in portions where the density is low. When these factors are taken into consideration, transition portion 4*c* of the present invention may be of a configuration in which the layer thickness increases from the central portion side of the electrode toward the end portion side as mentioned above. Transition portion 4*c* of the present invention may also be of a configuration in which the insulation resistance increases from the central portion side of the electrode toward the end portion side.

In addition, transition portion 4*c* of the present invention may be of a configuration in which the density increases from the central portion side of the electrode and toward the end portion side.

By combining these configurations, transition portion 4*c* may be of a configuration in which any two or all of the layer thickness, the insulation resistance, and density increase from the central portion side of the electrode and toward the end portion side.

For example, the material of resin layer 4 preferably has volume resistivity of at least $1 \times 10^{12} \Omega \cdot cm$ and more preferably at least $1 \times 10^{14} \Omega \cdot cm$. The thickness of high-permeability portion 4*a* of the upper surface of active material layer 3 is preferably no greater than 5 µm.

Resin layer 4 is preferably a mixture of one or more types of polymer resins and insulating particles. High-permeability portion 4*a*, low-permeability portion 4*b*, and transition portion 4*c* preferably contain the same resin. Further, in low-permeability portion 4*b*, pressing the resin layer reduces voids between insulating particles and polymer and can thus increase the insulation resistance. Alternatively, pressing a heating member against the resin to melt the resin and can increase the insulation resistance by reducing the voids.

Method for Manufacturing an Electrode

Figure 1B:
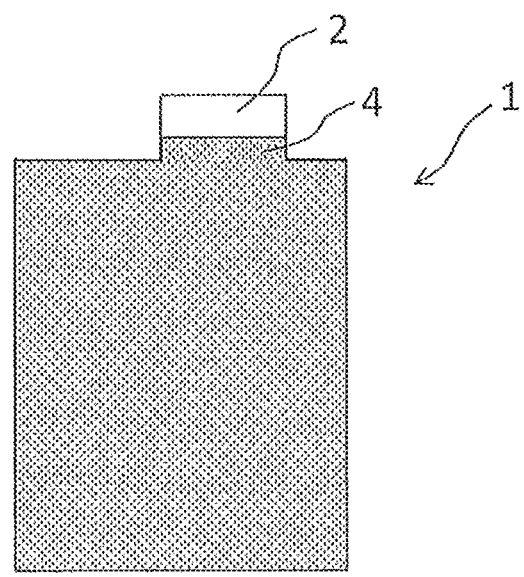
FIG. 1B is a top view of the electrode shown in FIG. 1A.
Figure 1C:
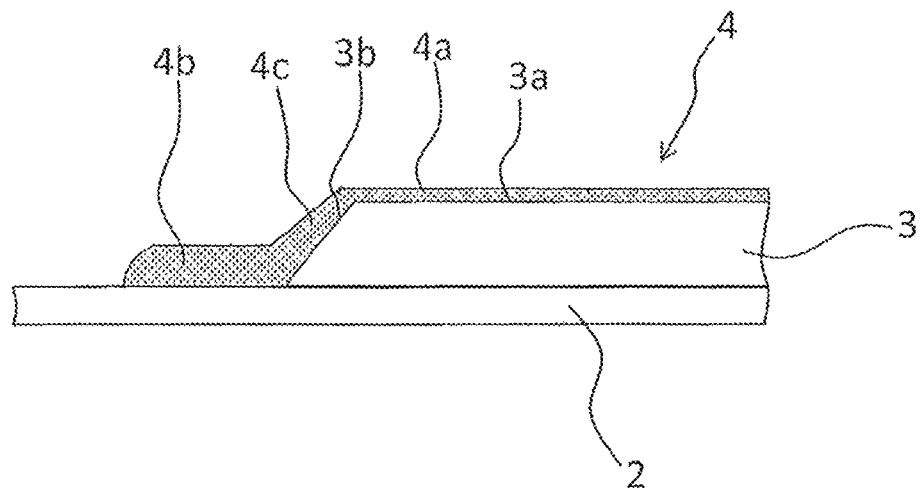
FIG. 1C is an enlarged view of the principal part of FIG. 1A.
Figure 2A:
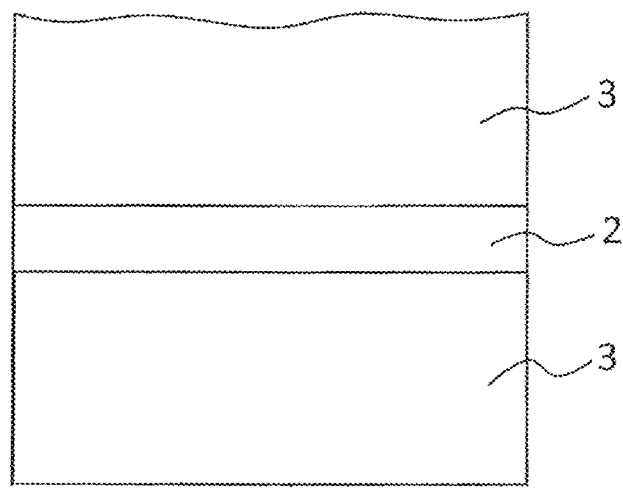
FIG. 2A is a top view showing the active material layer formation steps of an exemplary embodiment of the method for manufacturing the electrode of the present invention.
Figure 2B:
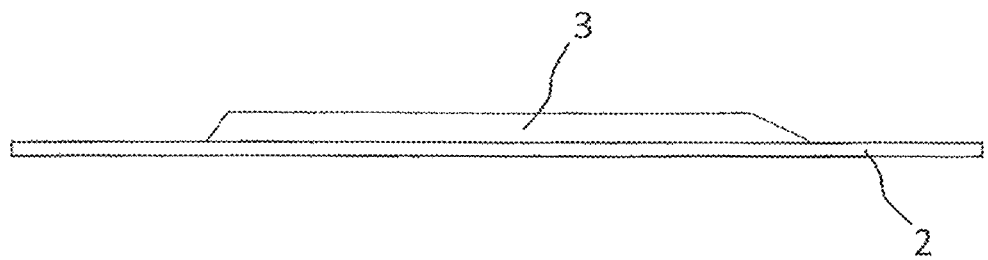
FIG. 2B is a side view showing the active material layer formation steps shown in FIG. 2A.
Figure 3A:
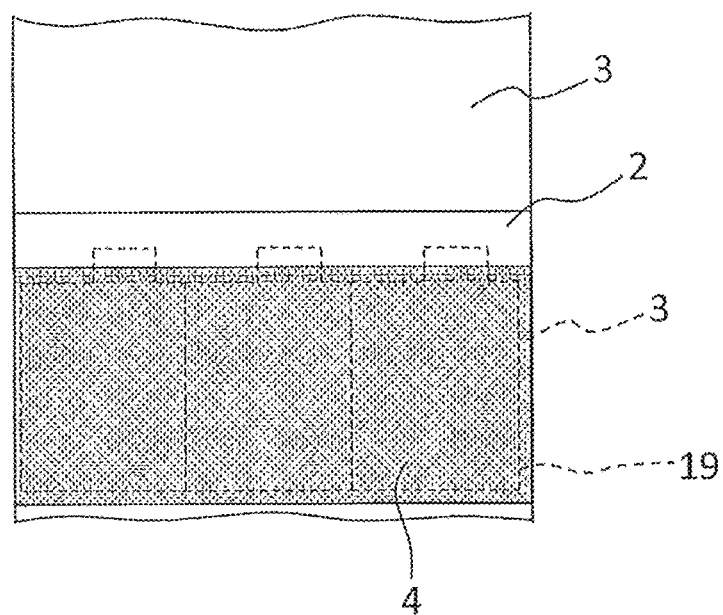
FIG. 3A is a top view showing the resin layer formation steps that follow the active material layer formation steps shown in FIGS. 2A and 2B.
Figure 3B:
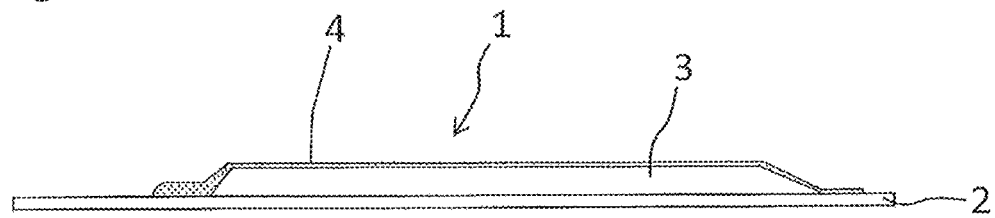
FIG. 3B is a side view showing the resin layer formation steps shown in FIG. 3A.

The method for manufacturing electrode 1 shown in FIGS. 1A-1C is next described. To efficiently manufacture electrode 1, active material layers 3 are formed on a plurality of portions of one long sheet shaped current collector 2 as shown in FIGS. 2A and 2B, and resin layer 4 is then formed as shown in FIGS. 3A and 3B. The formation of this active material layer 3 and the formation of resin layer 4 are carried out on the both sides of current collector 2. A plurality of electrodes 1 (refer to FIGS. 1A-1C) are then obtained by cutting along imaginary cutting line 19 shown in FIG. 3A.

In this method for manufacturing electrodes 1, resin layer 4 is formed by applying a coating agent that is chiefly composed of a polymer resin to cover the entire active material layer 3 that is the coated portion. Further, resin layer 4 extends beyond the boundary portion between the coated portion and non-coated portion and thus covers a portion of the non-coated portion.

As shown in FIG. 1C, resin layer 4 comprises high-permeability portion 4a positioned on upper surface 3a of active material layer 3, low-permeability portion 4b positioned on the non-coated portion, and transition portion 4c positioned between high-permeability portion 4a and low-permeability portion 4b. Transition portion 4c is formed such that the layer thickness continuously increases and the ion permeability and insulation resistance decrease from the central portion side of the electrode and toward the end portion side.

More specifically, mixture that contains active material is applied to a surface of current collector 2 while moving long sheet shaped current collector 2 in the longitudinal direction, to form active material layer 3. At this time, rather than continuously applying the coating agent without gaps on the surface of current collector 2, the coating agent is applied intermittently with a spacing. As a result, a plurality of active material layers 3 are formed that are mutually spaced along the longitudinal direction on the surface of current collector 2.

These active material layers 3 are pressed and flattened, and then resin layer 4 is formed. Resin layer 4 is formed by injecting coating agent that contains resin as its main component from die head 16 while moving current collector 2 in its longitudinal direction along arrow 20 of FIG. 4. Die head 16 can be brought close to or moved away from the conveyance path of current collector 2. For the sake of convenience, FIG. 4 either shows that die head 16 moves and current collector 2 does not move or shows that a plurality of die heads 16 are provided. However, a single die head 16 is arranged at a position that faces the conveyance path of current collector 2 that moves. As shown on the left side of FIG. 4, die head 16 starts to inject the coating agent when the specific portion of current collector 2 arrives at the position that faces die head 16, That specific portion of current collector 2 is positioned ahead of and is separated from the end portion on which active material layer 3 is formed by a predetermined distance.

The start position is set such that a non-coated portion of the current collector remains, the non-coated portion becoming a positive electrode tab or a negative electrode tab. The amount of coating agent which is injected is first increased to form low-permeability portion 4b.

Die head 16 next, at a position that faces inclined-plane shaped portion 3b of active material layer 3, gradually decreases the amount of the coating agent which is injected to form transition portion 4c.

Die head 16 then, inject a fixed small amount of coating agent to form high-permeability portion 4a at a position that faces upper surface 3a of active material layer 3. At this time, die head 16 moves away from the conveyance path of current collector 2 such that die head 16 does not collide with the upper surface of active material layer 3.
Current collector 2 then moves and the coating stops when active material layer 3 passes the position that faces die head 16 and die head 16 again approaches the conveyance path of current collector 2.

In this way, preparations are made for injecting the coating agent on a portion which is positioned ahead of and is separated from the end portion of next active material layer 3 by a predetermined distance.

Coating agent is thus injected as die head 16 moves with respect to the conveyance path of current collector 2 to enable the easy and precise formation of superior resin layer 4.

In addition, high-permeability portion 4a may be formed over the entire surface of the flat portion of active material layer or may be formed on only a portion of the flat portion. However, the coating end position is preferably set such that the resin layer is formed to protrude beyond the active material layer and onto the current collector.

The end portion in the longitudinal direction of the side on which tabs are not formed is later cut into a predetermined electrode shape. As a result, a portion of the resin that is formed on the current collector is discarded, but the effect can be obtained of preventing peeling of thin portion of the active material layer from the end portion of the electrode. A high-quality electrode can be obtained.

FIG. 5 shows another example of the formation steps of resin layer 4. In this example, die head 16 is not brought close to or moved away from the conveyance path of current collector 2. Instead, the amount of coating agent which is injected from die head 16 is varied, and the coating position and coating thickness are thus controlled to enable formation of a superior and highly precise insulating resin layer 4.

FIG. 5 gives a schematic representation of reduced-pressure region 21 due to variation of the amount of coating agent which is injected from die head 16.

If a tape type insulating material is adhered to the boundary portion between a coated portion and a non-coated portion, positioning the tape type insulating material at the inclined position of the boundary portion is important in order not to make a large difference in the thickness of the electrode comprising the tape type insulating material. However, it is difficult to distinguish the boundary portion between upper surface 3a of the active material layer and inclined portion 3b. This problem raises concerns for a decrease in productivity.

In the present invention, a coating agent that is composed chiefly of resin is applied. As a result, varying the layer thickness of insulating resin layer 4 can be realized by adjusting the application amount of the coating agent and by changing the distance between the die head that is a part of the coating device and the current collector foil.

In addition, high-permeability portion 4a of resin layer 4 having substantially uniform thickness which is no greater than 10 μm, and more preferably, no greater than 5 μm is provided on upper surface 3a of active material layer 3.

As a result, there is no portion having greater thickness than the thickness of other portions. Variations in the electrical characteristics or decrease of cycle characteristics can be prevented or reduced.

Accordingly, rather than providing high-permeability portion 4a over entire upper surface 3a of active material layer 3, high-permeability portion 4a can be provided only in the vicinity of the boundary portion with the transition portion (not shown in the figures). Because the thickness of high-permeability portion 4a is very small, protrusion of the portion of resin layer 4 can be extremely small even when electrodes are laminated to produce a laminate.

In addition, in the present invention, the amount of the coating agent, the distance between the die head and the current collector, or both of these factors can be adjusted by the die head. It is possible to adjust the thickness of resin layer 4 to form resin layer 4 such that resin layer 4 can have any thickness based on the position of the electrode.

The thickness of low-permeability portion 4b is preferably less than the total of the thicknesses of active material layer 3 and high-permeability portion 4a. When the thickness of low-permeability portion 4b is greater than the total of the thicknesses of active material layer 3 and high-permeability portion 4a, it is possible to prevent local protrusion of the laminate due to the insulating resin by reducing the thickness of the negative electrode. However, when reducing the thickness on the negative electrode side, it is necessary to prevent the A/C balance of the negative electrode side from being locally inverted.

In the manufacturing method of the electrode in the aforementioned exemplary embodiment of the present invention, after forming active material layer 3, a press process is carried out, following which the formation of resin layer 4 is carried out. However, the formation of resin layer 4 can also be carried out after active material layer 3 has been formed without carrying out the press process. The press process can then be carried out after the active material layer and insulating resin layer are stacked. At this time, high-resistance part 4b may be subjected to an additional process of increasing resistance by using another compression process or melting process. Alternatively, another resin may be provided to fill the voids in the resin layer. For example, a resin can be filled in voids by an ink jet method.

In addition, electrode 1 of the present invention is not limited to a configuration in which active material layer 3 and resin layer 4 are formed on both surfaces of current collector 3 as previously described. Electrode 1 may have a configuration in which active material layer 3 and resin layer 4 are formed on only one surface of current collector 2.

Long current collector 2 on which active material layer 3 and resin layer 4 are formed in this way can be wound in a roll form without being cut, to form an electrode roll (not shown in the figures). This electrode roll can be stored to enable the manufacture of a multiplicity of electrochemical devices with extremely high efficiency.

An electrochemical device that is manufactured using electrode 1 described hereinabove is next described. In the example described below, aforementioned electrode 1 is used as the positive electrode of a laminated-type secondary battery that is one type of electrochemical device. Electrode 1 is referred to as "positive electrode 1," current collector 2 is referred to as "positive electrode current collector 2," and active material layer 3 is referred to as "positive electrode active material 3." Electrode 1 may be a component that is cut from an electrode roll.

Configuration of a Laminated-Type Secondary Battery

Figure 6B:
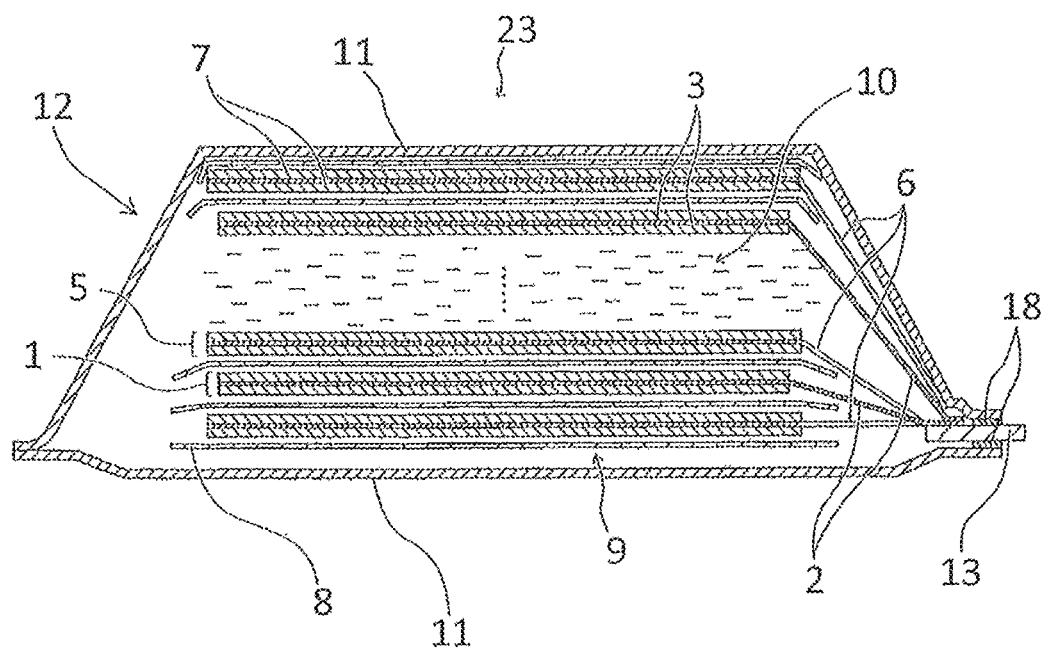
FIG. 6B is a cross-sectional view taken along line A-A of FIG. 6A.

Laminated-type secondary battery 23 that is an example of an electrochemical device that comprises aforementioned electrodes 1 as the positive electrodes is next described with reference to FIGS. 6A and 6B. FIGS. 6A and 6B schematically show laminated-type secondary battery 23 that comprises positive electrodes 1 that are manufactured according to the present invention. FIG. 6A is a top view as perpendicularly seen from above the principal surface (flat surface) of secondary battery 23. FIG. 6B is a cross-sectional view taken along line A-A of FIG. 6A.

For the sake of convenience, FIGS. 6A and 6B omit resin layer 4, and further, simplify the shape of active material layer 3. However, positive electrodes 1 that each comprise resin layer 4 shown in FIGS. 1A-1C are used. Negative electrodes 5 each comprise negative current collector 6 and negative active material layer 7 applied to this negative current collector 6. Negative electrodes 5 have a coated portion and a non-coated portion on the both sides of negative current collector 6.

Secondary battery 23 of the present exemplary embodiment is provided with a storage element, which is multilayered electrode body 9. In multilayered electrode body 5, positive electrode sheets 1 and negative electrode sheets 5 are alternately laminated with separators 8 interposed therebetween.

This multilayered electrode body 9 is accommodated together with electrolyte 10 in the inside of external container 12 that is composed of laminated flexible film 11. One end portion of positive electrode terminal 13 is connected to positive electrodes 1 of multilayered electrode body 9. One end portion of negative electrode terminal 14 is connected to negative electrodes 5. The other end portion of positive electrode terminal 13 and the other end portion of negative electrode terminal 14 extend to the outside of external container 12 composed of flexible film 11.

In FIG. 6B, layers in the central portion in the thickness direction that makes up multilayered electrode body 9 are omitted from the figures to show electrolyte 10. In FIG. 6B, in the interest of clarification, positive electrodes 1, negative electrodes 5, separators 8 and flexible film 11 are each shown as not being in contact with each other. However, these components are laminated in close contact with each other in actuality.

The outer dimensions of negative electrode active material layer 7 are longer than the outer dimensions of positive electrode active material layer 3. Negative electrode active material layer 7 is the coated portion of negative electrodes 5. Positive electrode active material layer 3 is the coated portion of positive electrodes 1. The outer dimensions of negative electrode active material layer 7 are equal to or smaller than the outer dimensions of separators 8. Positive electrode active material layer 3 has a smaller area than negative electrode active material layer 7. Therefore, resin layer 4 to prevent electrical short-circuits is preferably provided at the end portions of positive electrode active material layers 3.

Negative electrode active material layer 7 has a large area and the concern regarding an electrical short-circuit is small. However, low-permeability portion 4b of resin layer 4 is preferably formed on negative electrode active material layers 7. When separator 8 is damaged by, for example, heat, low-permeability portion 4b prevents electrical short-circuits with adjacent positive electrodes 1. In this case, negative electrodes 5 can be formed by the aforementioned method for manufacturing the electrode of the present invention.

When manufacturing this secondary battery 23, positive electrodes 1 and negative electrodes 5 are alternately laminated with separators 8 interposed therebetween. Positive electrode terminal 13 and negative electrode terminal 14 are then connected. More specifically, the positive electrode tabs of positive electrodes 1 are stacked together in close contact with each other on one end portion of positive electrode terminal 13. Positive electrode tabs are the non-coated portions of positive electrode current collectors 2. Positive electrode tabs and positive electrode terminal 13 are bonded together by, for example, ultrasonic welding.

At negative electrodes 5 as well, the plurality of negative electrode tabs are stacked together on one end portion of negative electrode terminal 14. Negative electrode tabs are the non-coated portions of negative electrode current collectors 6. Negative electrode tabs and negative electrode terminal 14 are bonded by, for example, ultrasonic welding. Positive electrode tabs and negative electrode tabs are not covered by resin layer 4.

Multilayered electrode body 9 has been thus completed by connecting positive electrode terminal 13 to positive electrode current collectors 2 and by connecting negative electrode terminal 14 to negative electrode current collectors 6. Multilayered electrode body 9 is covered by flexible film 11 from both sides of the principal surfaces.

Pressure and heat are then applied to the portion in which flexible films 11 are overlap each other except for a portion on the outer side of the outer peripheral of multilayered electrode body 9 as viewed planarly. The inner resin layers made up from the thermally fusible resin of flexible film 11 are bonded together by thermal fusing. At this time, positive electrode terminal 13 and negative electrode terminal 14 are secured to the outer periphery of flexible films 11 by way of sealant 18 that has been provided.

On the other hand, a portion to which pressure and heat are not applied remains unbonded in the portions where flexible films 11 overlap each other. The unbonded portion is an opening used as an injection port.

Typically, the injection port is formed in a portion of one side of external container 12 except for the side on which positive electrode terminal 13 and negative electrode terminal 14 are arranged.

Electrolyte 10 is then injected inside external container 12 from injection port. The sides other than the side having the injection port, have already been sealed. Injected electrolyte 10 will therefore not leak. In addition, electrolyte 10 will not intrude in the overlapped portions of flexible films 11 in the sides that have already been sealed. Pressure and heat are then applied to the injection port. The inner resin layers made up from the thermally fusible resin of flexible film 11 are bonded together by thermal fusing. In this way, secondary battery 23 that is an example of an electrochemical device is completed.

In secondary battery 23 of the present exemplary embodiment, active materials that can make up positive electrode active material layer 3 comprise a layered oxide-based material such as $LiCoO_2$, $LiNiO_2$, $LiMn_2O_2$, $Li_2MO_3$—$LiMO_2$, or $LiNi_{1/3}Co_{1/3}Mn_{1/3}O_2$; a spinel-based material such as $LiMn_2O_4$; an olivine-based material such as $LiMPO_4$; an olivine-fluoride-based material such as $Li_2MPO_4F$ and $Li_2MSiO_4F$; and a vanadium oxide-based material such as $V_2O_5$. M is a transition metal. In each positive electrode active material, a portion of the elements that make up these active materials may be substituted by other elements. In addition, Li may be an excess composition. One type or a mixture of two or more types of these active materials can be used.

Active materials that can make up negative electrode active material layer 7 comprise: carbon materials such as graphite, amorphous carbon, diamond-like carbon, fullerene, carbon nanotube, and carbon nanohorn; lithium metal materials; alloy-type materials of such as silicon or tin; oxide-based materials such as $Nb_2O_5$ or $TiO_2$; or a composite of these materials.

Active material mixtures that make up positive electrode active material layers 3 and negative electrode active material layers 7 are realized by adding binding agents or conductive auxiliary agent as appropriate to each of the aforementioned active materials. One type or a combination of two or more types of, for example, carbon black, carbon fiber, and graphite can be used as conductive auxiliary agent. As the binding agent, polyvinylidene fluoride, styrene-butadiene rubber, polytetrafluoroethylene, carboxymethyl cellulose, and modified acrylonitrile rubber particles can be used. In positive electrode active material layers 3 and negative electrode active material layers 7, unavoidable inclination, unevenness, and curvature in each layer are permitted. Inclination, unevenness, and curvature in each layer arise due to, for example, variations in manufacturing processes or layer formation capabilities.

As positive electrode current collectors 2, aluminum, stainless steel, nickel, titanium, or an alloy of these metals can be used. In particular, aluminum is preferable. As negative electrode current collectors 6, copper, stainless steel, nickel, titanium, or an alloy of these metals can be used.

As electrolyte 10, one type or a mixture of two or more types from among organic solvents, for example, cyclic carbonates such as ethylene carbonate, propylene carbonate, vinylene carbonate, and butylene carbonate; chain carbonates such as ethylmethyl carbonate (EMC), diethyl carbonate (DEC), dimethyl carbonate (DMC), and dipropyl carbonate (DPC); aliphatic carboxylic acid esters; γ-lactones such as γ-butyrolactone; chain ethers and cyclic ethers can be used. Still further, lithium salts can be dissolved in these organic solvents.

Separators 8 are chiefly composed of porous membranes, woven fabrics, and nonwoven fabrics made from resin. Resin components that can be used include, for example, polyolefin resins such as polypropylene and polyethylene, polyester resin, acryl resin, styrene resin, nylon resin, aromatic polyamide resin, and polyimide resin. In particular, polyolefin-based microporous membrane is preferable due to its ion permeability and superior capability to physically isolate positive electrodes and negative electrodes. In addition, according to necessity, layers that contain inorganic particles may be formed in separators 8. Materials that can be used as the inorganic particles include insulating oxides, nitrides, sulfides, and carbides. Materials that include $TiO_2$ and $Al_2O_3$ are particularly preferable. The inclusion of insulating inorganic particles not only in electrodes but also in separators as well can provide safer batteries.

External container 12 is a lightweight outer case composed of flexible film 11. Flexible film 11 is a laminated film. Resin layers are provided on both surfaces of a metal foil that is the base material in flexible film 11. The metal foil can be selected from materials having a barrier property for preventing the leakage of electrolyte 10 or for preventing the intrusion of moisture from the outside. Aluminum, stainless steel and the like can be used as the metal foil. A thermally-fusible resin layer such as modified polyolefin is provided on at least one surface of the metal foil. Thermally-fusible resin layers of flexible films 11 are arranged to opposite each other. Thermally-fusible resin layers are thermally fused together around the portion that accommodates multilayered electrode body 9 to form external container 12. As the surface of external container 12, a resin layer such as a nylon film, polyethylene terephthalate film, or polyester film can be provided on the surface of the metal foil. That surface is on the opposite side from the surface on which the thermally fusible resin layer is formed.

Aluminum or an aluminum alloy can be used as positive electrode terminal 13. Copper, a copper alloy, nickel-plating copper or copper alloy, or nickel can be used as negative electrode terminal 14. The other end portion sides of each of terminals 13 and 14 extend to the outside of external container 12. Sealant 18 of thermally-fusible resin has been provided on the portions of each of terminals 13 and 14. That portions correspond to the portions to be thermally welded of the outer periphery of external container 12.

The present invention is particularly useful in a lithium-ion secondary battery. However, the present invention is also effectively applied to secondary batteries other than lithium-ion batteries or to electrochemical devices other than batteries such as capacitors or condensers.

While the invention has been particularly shown and described with reference to exemplary embodiment thereof, the invention is not limited to this exemplary embodiment. It will be understood by those of ordinary skill in the art that various changes in form and details may be made therein without departing from the spirit and scope of the present invention as defined by the claims.

EXPLANATION OF REFERENCE NUMBERS 1 positive electrode
2 positive electrode current collector
3 positive electrode active material layer
3a upper surface
3b inclined-plane shaped portion
4 resin layer
4a high-permeability portion
4b low-permeability portion
4c transition portion
5 negative electrode
6 negative electrode current collector
7 negative electrode active material layer
8 separator
10 multilayered electrode body
10 electrolyte
11 flexible film (laminated film)
12 external container
13 positive electrode terminal
14 negative electrode terminal
16 die head
18 sealant
19 cutting line
23 laminated-type secondary battery (electrochemical device)

What is claimed is:

1. An electrode for an electrochemical device comprising:
a coated portion in which an active material layer is formed on a current collector;
a non-coated portion in which the active material layer is not formed; and
a resin layer that is laminated such that the coated portion and a portion of the non-coated portion are covered,
wherein the resin layer comprises:
a high-permeability portion positioned on the coated portion;
a low-permeability portion having a lower ion permeability than the high-permeability portion and positioned on a portion of the non-coated portion; and
a transition portion in which an ion permeability decreases from a high-permeability portion side, at which the high-permeability portion is arranged, toward a low-permeability portion side, at which the low-permeability portion is arranged, and positioned between the high-permeability portion and the low-permeability portion,
wherein an end portion of the coated portion comprises an inclined-plane shaped portion formed in an inclined-plane shape,
wherein the transition portion is formed over the inclined-plane shaped portion, and
wherein, in a direction from the high permeability portion to the low permeability portion, the high-permeability portion comprises a constant level of ion permeability along a length of the coated portion directly up to the inclined-plane shaped portion.

2. The electrode according to claim 1, wherein the volume resistivity of the resin layer is at least $1 \times 10^{12} \Omega \cdot cm$.

3. The electrode according to claim 1, wherein a layer thickness of the high-permeability portion is thinner than a layer thickness of the low-permeability portion, and
a layer thickness of the transition portion increases from the high-permeability portion side toward the low-permeability portion side.

4. The electrode according to claim 1, wherein an insulation resistance of the high-permeability portion is lower than an insulation resistance of the low-permeability portion, and
an insulation resistance of the transition portion increases from the high-permeability portion side toward the low-permeability portion side.

5. The electrode according to claim 1, wherein a density of the high-permeability portion is lower than a density of the low-permeability portion, and
a density of the transition portion increases from the high-permeability portion side toward the low-permeability portion side.

6. The electrode according to claim 1, wherein the resin layer contains an insulating material.

7. The electrode according to claim 6, wherein the insulating material is alumina powder.

8. The electrode according to claim 1, wherein a portion of the non-coated portion that is not covered by the resin layer is an electrode tab that is connected to an electrode terminal.

9. An electrochemical device comprising:
a multilayered electrode body in which the electrode according to claim 1 is used as positive electrodes, negative electrodes, or both the positive electrodes and the negative electrodes,
and the positive electrodes and the negative electrodes are alternately laminated with separators interposed therebetween; and
an external container that accommodates the multilayered electrode body and an electrolyte.

10. A method of manufacturing an electrode for an electrochemical device, the method comprising steps of:
forming an active material layer on a portion of a current collector to provide a coated portion in which the active material layer is formed on the current collector and a non-coated portion in which the active material layer is not formed; and
laminating a resin layer to cover the coated portion and a portion of the non-coated portion,
wherein in the step of laminating the resin layer;
a high-permeability portion positioned on the coated portion,
a low-permeability portion having a lower ion permeability than the high-permeability portion and positioned on a portion of the non-coated portion, and
a transition portion in which ion permeability decreases from the high-permeability portion side, at which the high-permeability portion is arranged, toward the low-permeability portion side, at which the low-permeability portion is arranged, and which is positioned between the high-permeability portion and the low-permeability portion, are formed as the resin layer.

11. The method of manufacturing an electrode according to claim 10,
wherein the high-permeability portion, the low-permeability portion and the transition portion are formed such that:
a layer thickness of the high-permeability portion is thinner than a layer thickness of the low-permeability portion, and
a layer thickness of the transition portion increases from the high-permeability portion side toward the low-permeability portion side.

12. The method of manufacturing an electrode according to claim 10,
wherein the high-permeability portion, the low-permeability portion and the transition portion are formed such that:
an insulation resistivity of the high-permeability portion is lower than an insulation resistivity of the low-permeability portion, and
an insulation resistivity of the transition portion increases from the high-permeability portion side toward the low-permeability portion side.

13. The method of manufacturing an electrode according to claim 10,
wherein the high-permeability portion, the low-permeability portion and the transition portion are formed such that:
a density of the high-permeability portion is lower than a density of the low-permeability portion,
a density of the transition portion increases from the high-permeability portion side toward the low-permeability portion side.

14. The method of manufacturing an electrode according to claim 10, wherein:
the active material layer is formed intermittently along the longitudinal direction of the current collector;
the resin layer is formed on the active material layer, and is formed to protrude onto the non-coated portion on one end portion side in the longitudinal direction of the active material layer, and onto the non-coated portion of another end portion side of the active material; and
the method comprises a step of cutting the electrode in a predetermined shape such that the electrode comprises the non-coated portion on which resin layer is not formed.

15. The method of manufacturing an electrode according to claim 10, further comprising a step of filling voids of the resin and insulating material of the low-permeability portion by compressing the resin layer, melting the resin of the resin layer, or spraying resin.

16. A method of manufacturing an electrochemical device comprising steps of:
forming positive electrodes, negative electrodes or both positive electrodes and negative electrodes by the method of manufacturing an electrode according to claim 1;
forming a multilayered electrode body by alternately laminating the positive electrodes and the negative electrodes with separators interposed therebetween; and
accommodating the multilayered electrode body and an electrolyte inside an external container.

17. The electrode according to claim 1,
wherein, in the direction from the high-permeability portion to the low-permeability portion, a thickness of the transition portion increases from the high-permeability portion to the low-permeability portion as a thickness of the inclined-plane shaped portion of the end portion of the coated portion decreases towards the low-permeability portion.

18. The electrode according to claim 17,
wherein the transition portion is formed directly over an entirety of the inclined-plane shaped portion from the high-permeability portion to the low-permeability portion, and
wherein the thickness of the transition portion is increases along an entire length of the inclined-plane shaped portion in the direction from the high-permeability portion to the low-permeability portion.

* * * * *